United States Patent [19]

Hinsche et al.

[11] 4,072,786

[45] * Feb. 7, 1978

[54] PRODUCTION OF FLOOR TOPPINGS BY FLOWING INORGANIC BINDER SUSPENSIONS OVER POROUS OPEN-CELL UNDERLAYS

[75] Inventors: Friedrich Hinsche, Leverkusen; Kurt Schaupp, Cologne, both of Germany

[73] Assignee: Bayer Aktiengesellschaft, Leverkusen, Germany

[*] Notice: The portion of the term of this patent subsequent to Feb. 1, 1994, has been disclaimed.

[21] Appl. No.: 608,953

[22] Filed: Aug. 29, 1975

[30] Foreign Application Priority Data

Sept. 3, 1974 Germany ............................ 2442183

[51] Int. Cl.$^2$ .............................................. E04B 5/00
[52] U.S. Cl. ...................... 428/537; 52/741; 156/71; 260/2.5 F; 264/31; 264/35; 427/299; 427/403; 428/538
[58] Field of Search ............ 52/515, 744, 741; 156/71; 427/299, 403, 136; 428/537, 538; 404/72, 82; 264/31, 35

[56] References Cited

U.S. PATENT DOCUMENTS

| | | | |
|---|---|---|---|
| 825,870 | 7/1906 | Schirra | 428/448 |
| 1,664,638 | 4/1928 | Mitter | 52/516 X |
| 2,021,513 | 11/1935 | Levine | 264/31 X |
| 2,078,289 | 4/1937 | Sloan | 264/31 |
| 2,165,437 | 7/1939 | Adam | 264/31 |
| 2,307,696 | 1/1943 | Blair-McGuffie | 427/403 |
| 2,362,060 | 11/1944 | Etridge et al. | 428/309 |
| 2,662,825 | 12/1953 | Kauffmann et al. | 106/40 |
| 2,954,301 | 9/1960 | Szukiewicz | 427/136 |
| 3,454,688 | 7/1969 | Foster et al. | 264/42 |
| 3,694,298 | 9/1972 | Veschuroff et al. | 428/70 |
| 3,850,650 | 11/1974 | Bonin et al. | 106/75 |

*Primary Examiner*—Michael R. Lusignan
*Attorney, Agent, or Firm*—Burgess, Dinklage & Sprung

[57] ABSTRACT

In the production of a floor topping by the flow method, comprising providing a water-absorbing layer on a floor to be topped, pouring a free-flowing mass comprising an inorganic binder and water onto said water-absorbing layer whereby said mass forms a level floor topping, and allowing said mass to harden, the improvement which comprises employing as said water-absorbing layer a strong porous open-cell material. The open-cell material which serves as a water absorptive underlay preferably comprises at least one of anhydrite, gypsum, cement and lime. Preferably it is formed in place by casting a foamed mass comprising an aqueous suspension of gypsum, an aluminum salt, hydrogen peroxide and a manganese compound.

7 Claims, No Drawings

PRODUCTION OF FLOOR TOPPINGS BY FLOWING INORGANIC BINDER SUSPENSIONS OVER POROUS OPEN-CELL UNDERLAYS

The present invention relates to producing floor toppings by pouring an inorganic binder supsension and allowing it to level out and harden.

In one known process, floor toppings in the form of hard, completely flat and horizontal surfaces are produced in a single operation by a simple flow method from binders containing calcium sulfate, optionally in the presence of additives, using special auxiliaries such as water-soluble polysaccharides. The binder-containing paste from which the floor topping is produced has to be fluid enough to be able to level out solely under the effect of gravity. A flat, horizontal surface is automatically formed.

A mortar or undiluted binder paste having such a fluid consistency that, like water, it automatically assumes the required form can be similarly prepared from anhydrite by using special auxiliaries. In this way, it is possible, for example, to produce floor toppings whose surface levels out smoothly and horizontally without any need for mechanical aids. Prefabricated elements, for example panels, can be similarly produced from the above-mentioned free-flowing binder compositions.

In the processes referred to above, the fluidity of the mortars is generally obtained by using special chemical auxiliaries. These auxiliaries enable the water-binder factor, which determines the fluidity of the mortar or binder paste, to be kept at precisely such a level that the required strengths are obtained. Thus, according to German DOS No. 9,943,634, the fluidity of a mortar of anhydrite is increased by adding a sedimentation-retarding substance, in the form of a water-soluble cellulose ether, to such an extent that the mortar spreads out quickly and evenly over the substrate. In addition, an auxiliary, for example in the form of a sulfite- or sulfonic-acid-modified resin based on an amino-s-triazine with at least two amino groups, is used to increase strength according to the above-mentioned DOS, enabling the anhydrite mortar to be processed with more water and, hence, in a fluid consistency.

The particular disadvantage of this process is that the chemical auxiliaries required for the process and the quantity of mixing water required have to be adapted very accurately to the properties of the particular anhydrite used. If this is not the case, considerable disadvantages and damage can be caused, for example in the form of cracks, "shell" formation in the surface, inadequate strengths and overlong hardening times. In addition, the necessary use of relatively expensive chemical auxiliaries makes this process expensive despite the saving of working time.

In another process, anhydrite is processed together with water and corresponding additives in a high-speed mixer to form a free-flowing paste, the ratio by weight of mixing water to anhydrite being from 0.25:1 to 0.40:1. A flow angle of 0° to 30° C is obtained during casting. A flat, smooth surface is obtained either by switching on a vibrator and/or by machine smoothing (German DOS No. 2,107,484). Although, in this process, the anhydrite composition can be introduced relatively easily without any need for special, expensive chemical auxiliaries, mechanical treatment is required for obtaining a satisfactorily smooth and flat surface during or after laying, so that the labor saved during introduction of the anhydrite composition is not always reflected in reduced costs.

Application Ser. No. 459,821, filed Apr. 10, 1974, now U.S. Pat. No. 4,005,954, patented Feb. 1, 1977, the disclosure of which is incorporated herein by reference, relates to the production of floor toppings from inorganic binders by the flow method, wherein the binder in diluted or undiluted form is made into a fluid mass by the addition of water, optionally together with auxiliaries, and the resulting mass is applied to a water-absorbing layer. It is possible by this process, even in the absence of chemical auxiliaries and without any need for mechanical surface treatment, to obtain floor toppings with a flat, even surface by using a binder paste in diluted or undiluted form which is mixed with water in such a quantity that a free-flowing mass is formed. This "levelling mass" is cast onto a substrate which is capable of absorbing water. It levels out automatically into the required form and, after a few hours, hardens into a solid mass with a flat, smooth surface. It has proved to be particularly advantageous to use, as the inorganic binder, a synthetic or natural anhydrite with a water-binder factor in the binder paste of about 0.38 to 0.75, preferably about 0.45 to 0.60. Anhydrite binder paste of this kind may readily be prepared either continuously or even in batches, for example in a high-speed mixer. A creamy, homogeneous suspension is formed and is advantageously pumped from the mixer direct to the processing zone where it flows over the water-absorbing layer applied to the load-bearing substrate. However, it is also possible to use other binders such as, for example, cement, gypsum or magnesia cement. The binders may be used in undiluted form or in diluted form with fillers added to them. Suitable fillers are, for example, fine sand, expanded clay, pumice, filter ash and other sound-insulating and heat-insulating materials. The fillers may be used in quantities of about 10 to 300 % by weight and preferably in quantities of about 50 to 150 % by weight, based on the binder. However, undiluted binder pastes are preferably used.

A material which binds the water taken up so firmly that it is not liberated, even at elevated temperatures, is advantageously used as the water-absorbing layer. It is preferred to use materials which set by absorbing water such as, for example, gypsum, natural or synthetic anhydrite, cement or mixtures of these materials which produce bonds of high strength with the water taken up. The water-absorbing material may be used either in powder form or in compacted form, for example in the form of a finely divided granulate or in the form of a compression-molded panel.

The water-absorbing layer should be able to absorb water which, although present in excess, is nevertheless required for the fluidity of the levelling mass, to such an extent that the quantity of water required for hydration of the binder is still guaranteed, taking into account the inevitable evaporation losses. In addition, the layer should be able fully to develop its water-absorbing effect only when the levelling mass introduced is no longer required to flow. This is the case when the thickness required for the topping to be produced has been reached after the spontaneous levelling of the mass, i.e., when a smooth, flat surface has formed. The requisite capacity of the water-absorbing layer, i.e., the quantity of water taken up, is governed by the thickness of the layer of topping to be introduced and by the water-binder factor of the levelling mass. On the other hand, the intensity, i.e., the rate at which water is taken up by the water-absorbing layer, is governed by the area-to-volume ratio of the levelling mass.

Accordingly, the thickness of the water-absorbing layer is related to the total quantity of water introduced by the levelling mass. This quantity, as already mentioned, is governed both by the water-binder factor of the levelling mass and by the thickness of the layer of topping to be produced by the flow method. Accordingly, for levelling masses with different water-binder factors, the thickness of the water-absorbing layer is best quoted as a fraction of the quantity of solids introduced through the levelling mass per unit area. For example, in the case of levelling masses with water-binder factors of about 0.38 to 0.75, the proportion by weight of the materials used for the water-absorbing layer, per unit area of the layer of topping to be produced, will amount to between about 2.5 and 42% by weight of the quantity of solids introduced through the levelling mass per unit area. The proportion by weight of the water-absorbing layer increases with increasing water-binder factors of the levelling mass. In the case of levelling masses with preferred water-binder factors of about 0.45 to 0.60, the proportion by weight of the materials used for the water-absorbing layer per unit area will amount to about 5 to 27 % by weight of the quantity of solids introduced through the levelling composition per unit area. In the case of levelling compositions with particularly preferred water-binder factors of about 0.50 to 0.55, the corresponding values for the proportions by weight of the water-absorbing layer amount to about 13 to 20 % by weight.

In a preferred embodiment of this process, the water-absorbing layer is covered by a waterpermeable barrier layer.

If floor toppings were produced by the conventional flow method with the high water-binder factors referred to above, shorter hardening times for practical requirements, higher strength levels and less cracks in those floor toppings would be desirable.

By this novel process it is possible to produce floor toppings with a smooth, flat surface which are distinguished by their rapid hardening and high strength levels. Another advantage of the proces is that the quick and relatively easy introduction of the hardenable mass, by comparison with conventional mortar processes, does not involve the use of expensive chemical auxiliaries, although chemical auxiliaries on an inorganic and/or organic basis may also be used in this process. Auxiliaries of this kind are, for example, the modified melamine resins referred to earlier, and also methyl cellulose, antifoaming agents such as, for example, tributylphosphate, and accelerators such as, for example, calcium sulfate dihydrate, etc.

The floor toppings produced in this way are distinguished by a surface free of dried binder agglomeration which is particularly suitable for the application of coverings. In conventional processes, laitances occur when the mortar introduced is too wet, and in the new processes referred to earlier when the individual components are not carefully matched with one another. They prevent satisfactory adhesion between topping and covering and are frequently the cause of serious damage.

It has now been found that floor toppings can be produced from inorganic binders using the flow method by a process in which the binder indiluted or undiluted form is made into a fluid mass by the addition of water, optionally together with auxiliaries, and applied to a water-absorbing layer, this process being distinguished by the fact that the water-absorbing layer comprises a strong porous open-cell material.

By using strong, porous materials, the water-absorbing effect is delayed to such an extent that there is generally no need for a water-permeable barrier layer between the fluid mass (levelling mass) and the water-absorbing layer (absorption layer) for controlling the absorption effect. According to the present invention, it is possible to produce floor toppings which are distinguished, for example from the toppings of the earlier proposal, by a relatively low unit weight and by the saving of material. The unit weight may be varied within wide limits dependent upon the pore volume of the absorption layer.

Another advantage is that absorption layers of the kind in question have excellent insulting properties, for example with respect to sound and heat. As a result, that is also no need for the conventional insulating layer arranged between the substrate and topping.

Suitable porous, strong materials are any materials which are able to absorb water. There is no need for the water taken up to be chemically bound. To produce the porous material, a liquid mass is expanded or foamed, and hardened with the foam structure intact. Suitable materials are inorganic, organic and inorganic-organic materials. The porous material is preferably made of substances which set by absorbing water and show high strength. Materials of this kind, are for example, natural or synthetic anhydrite, gypsum, cement, lime or mixtures thereof.

The foaming of aqueous suspensions of calcium sulfate semihydrate, known as plaster of Paris, or of anhydrouus calcium sulfate, known as anhydrite, is known in principle. Thus, it is possible by mixing a gypsum pulp with an aqueous foam prepared separately therefrom to obtain a mass permeated by air voids which sets with its pore structure largely intact (Austrian Patent No. 176,493, German DOS 2,056,255). In other known processes, a gas is produced by chemical reaction in the pulp, and the gas forms the required pore structure. It is preferred to produce carbon dioxide as the blowing gas by reacting carbonates with acids or acid-reacting salts such as, for example, aluminum sulfate (German DAS 1,300,459 and DAS 1,571,5750. It is also possible to decompose hydrogen peroxide catalytically in inorganic binders in an alkaline medium, as a result of which oxygen is given off (U.S. Pat. No. 2,662,825, German Patent No. 928,039, Austrian Patent No. 176,493). Manganese compounds are used for catalytically decomposing the $H_2O_2$. Foamed layers or bodies on an inorganic and, optionally, organic basis may also be produced from metal silicates or silica sols and polyisocyanates (German Patent No. 2,227,608 and DOS 2,210,837; 2,165,912; 2,226,841 and 2,228,359).

Particularly good results are obtained with porous open-cell layers produced as follows: In one process, aqueous alkaline suspensions of gypsum (in this context gypsum is partly or completely dehydrated calcium sulfate which sets through the addition of water, i.e. for example semihydrate, plaster of Paris, topping-grade gypsum, and also synthetic or natural anhydrite) are foamed by the addition of an aqueous hydrogen peroxide solution in the presence of manganese salts. Aluminum salts are added to stabilize the foam and to keep the pore structure intact. More particularly, the mixture foamed contains approximately 0.1 to 1.0 part per 100 parts of gypsum of a water-soluble aluminum compound, calcium oxide or calcium hydroxide in such a quantity that the end mixture has a pH-value in the range of 10 to 13, decomposition catalysts, water and, per 100 parts of the mixture, about 0.5 to 5 parts of 35 % hydrogen peroxide solution (0,175 to 1,75 parts of $H_2O_2$ on a waterfree basis) in water, the ratio of solids to liquid being about 1 : 0.5 to 1 : 1.

The mixture should show an alkaline reaction in aqueous suspension. Synthetic anhydrite normally contains about 0.3 to 3 % of calcium oxide or an equivalent quantity of calcium hydroxide. In all other cases, basic constituents are added to the gypsum. The calcium sulfate material should contain at least about 0.1 % of CaO or corresponding bases such as $Ca(OH)_2$. In addition ot CaO and $Ca(OH)_2$, it is also possible to use MgO or $Mg(OH)_2$.

Water-soluble aluminum salts are added in such a quantity that the mixture contains at least about a 40% molar excess of CaO or $Ca(OH)_2$. With a higher proportion of aluminum ions, the stabilizing effect on the foam deteriorates. In general, much smaller quantities of aluminum salts are adequate. They are preferably used in a proportion of about 0.05 to 0.20 equivalent, based on calcium oxide. Based on the mixture, the proportion of, for example, $Al(NO_3O_3.9 H_2O$ amounts to between about 0.1 and 1.0 % by weight and preferably to between about 0.2 and 0.5 % by weight. Corresponding equivalents apply to other aluminum salts. The aluminum salts should be adequately soluble in water. Suitable aluminum salts are, for example, aluminum chloride and aluminates, although it is preferred to use aluminum sulfate double salts (alums) and basic salts such as, for example, basic aluminum nitrate. Particularly good results are obtained with aluminum nitrate.

Suitable catalysts are any manganese compounds such as, for example, manganese sulfate or manganese chloride. Alkali-soluble manganese compounds, for example manganates and permanganates, are particularly effective. The catalysts may be added to the gypsum either in solid form or to a gypsum suspension in the form of an aqueous solution. The catalysts are thoroughly mixed with the material to ensure the uniform evolution of oxygen. The quantities used are governed by the effectiveness of the particular catalyst. For example, from 0.1 to 0.5 part of $KMnO_4$ are added to approximately 100 parts of gypsum. 0.3 part of $KMnO_4$, approximately 1 part of $MnSO_4$ or $MnCO_3$ or 3 parts of manganese dioxide are equally effective. It is also possible to use conventional activators such as for example, potassium sulfate for synthetic anhydrite or silica sol for plaster of Paris which additionally influence the setting behavior of the anhydrite or gypsum mixture in the requisite manner.

In addition, the fluidity may be adjusted by the addition of so-called plasticizers such as, for example, modified melamine resins or cellulose ethers and the like. Surface-active substances which promote foaming are preferably added to the mixture as well, about 0.01 to 0.1 part of wetting agent generally being used to 100 parts of the dry mixture. Wetting agents based on alkyl sulphonates are particularly suitable.

The gypsum used may consist of completely or partly dehydrated calcium sulfates which set through the addition of water, i.e., for example gypsum. It is also possible to use mixtures of semihydrate and anhydrite in any ratios, mixtures containing up to about 50% of semihydrate being preferred. Anhydrite-semihydrate mixtures containing about 10 to 40% of semihydrate (plaster of Paris) for adjusting their setting behavior are particularly suitable. However, it is also possible to use gypsum in admixture with other inorganic binders.

It is also possible to add to the mixture known additives with sound-insulating or heat-insulating properties or with strength-promoting properties, i.e., for example sand, calcium sulfate dihydrate, cork, expanded clay, pumice, glass fibers, glass wool, mineral wool, organic fibers, foamed glass particles, plastic granulates and also pigments. The process may be carried our either in batches or preferably, continuously. Where the process is carried out on the batch principle, a dry mixture of gypsum, containing an aluminum salt, a manganese salt and free calcium oxide or calcium hydroxide, is suspended with water in the mixing compartment of the machines normally used in building. An aqueous hydrogen peroxide solution optionally containing a wetting agent is introduced into the alkaline suspension. The foamed mass is discharged and cast by means of a slush pump. In another preferred embodiment, the peroxide solution is added after the suspension has left the mixing compartment, advantageously immediately after the slush pump. The suspension is foamed after delivery in a flexible hose, after which the foamed mass may be directly cast. The input ratio of solids to water to foamer solution may be varied as required. It is only the solids to liquid ratio which should be kept within the range of about 1 : 0.4 to 1 : 1. After a few hours, the cast layer has hardened to such an extent that it is self-supporting and shows outstanding strength on completion of setting and drying, which takes about 24 hours. The compressive strengths amount to between about 4 and 50 $kp/cm^2$ after completion of setting and drying depending on the particular unit weight. The unit weight may be varied within wide limits independence upon the quantity of hydrogen peroxide used and may amount to between about 200 and 800 $kg/m^3$. The pores are uniformly distributed and have a uniform size of about 0.1 to 4 mm and preferably about 0.2 to 2 mm.

One advantage of this process is that, after only about 1 minute at the longest, the foamed mass has reached 90% of its final volume. The foam structure is stabilized by the addition of the aluminum salts to such an extent that it is not distributed during further processing. On the other hand, hardening of the foamed mass may be adjusted within a relatively wide range. It may amount to between a few minutes and 30 minutes. This period of time which elapses before hardening may be adjusted in various ways, for example through the ratio of anhydrite to semihydrate, through the addition of activators, for example potassium sulfate, and above all through combination with the aluminum salts added. The use of aluminum salts and also alum shortens the setting time, while sulfate-free aluminum salts delay the beginning of stiffening by up to 30 minutes.

In the other process for the production of porous materials based on gypsum and/or anhydrite by the catalytic decomposition of hydrogen peroxide or its derivatives, substances capable of releasing active hydrogen ions are added to the gypsum or anhydrite mixture containing alkaline constituents (CaO, $Ca(OH)_2$, MgO, $Mg(OH)_2$). Particularly suitable substances of this kind are, for example, water-soluble monohydrogen and dihydrogen phosphates (for example K-, Na-, monohydrogen and dihydrogen phosphates, Al-hydrogen phosphates, etc). Water-soluble hydrogen sulfates may optionally be added as well.

By adding these substances, it is possible to provide for a gradual, controllable development of the pH-value and, in this way, accurately to adapt the evolution of gas and the blowing reaction to the setting behavior of the gypsum or anhydrite.

The acid-reacting additives are introduced in a quantity which is not sufficient for complete neutralization. The suspension is preferably adjusted to a final pH-value of from about 10 to 13.

This process affords the advantage that the mass to be foamed can be thoroughly mixed over a period of a few minutes without the blowing agent being prematurely decomposed through an increase in the pH-value. The liquid mixture may thus be introduced into the mold to be filled with foams and begins to expand slowly according to the required time set by adding the appropriate additives.

On completion of expansion or growth, which can take up to about 60 minutes, the foam is still free-flowing and begins to set at a constant volume. In one preferred embodiment of this process, pH-development of the mix in the alkaline range is extended over a period governed by the particular requirements. A period of about 15 minutes is sufficient in most cases. In this case, the necessary quantity of acid substances is generally less than about 50% of the quantity required for complete neutralization.

In the case of a $CaSO_4$ material with a CaO content of, for example, up to about 2%, about 0.2 to 0.6% of the highly effective hydrogen phosphates is sufficient. In this case, the degree of neutralization is below about 20%.

The water-absorbing layer made of porous material should be able to absorb water which, although present in excess, is nevertheless required for the fluidity of the levelling mass. The minimum necessary capacity of the water-absorbing layer, i.e., the quantity of water to be taken up, is governed by the layer thickness of the levelling mass to be applied and by its water-binder factor. The water uptake capacity may be determined by a simple preliminary test in each case.

The intensity, i.e., the rate at which water is taken up by the porous absorption layer, is governed both by the pore structure and by the residual moisture content of the absorption layer and is related to the area to volume ratio. In general, absorption layers made of porous material only develop their full water-absorbing effect when there is no longer any need for the levelling mass applied to flow. This is the case when the thickness required for the floor topping to be produced has been reached after the spontaneous levelling of the mass, i.e., when a smooth and flat surface has formed.

In one special embodiment, the water-absorption intensity is additionally regulated simply by spraying on or spreading on film-forming or water-repelling substances. For example, the following substances, optionally diluted with water, are suitable: plastic dispersions based on acrylate copolymers or non-ionic plasticizer-free plastics dispersions of a copolymer based on vinyl acetate and maleic acid di-n-butyl ester or of a copolymer based on vinyl propionate.

Surface treatment of this kind is advantageous, for example, in the flooring of large areas or in cases where overdried absorption layers are used.

The binder compositions described above have proved to be particularly effective levelling masses. An undiluted or slightly diluted binder paste is preferably used. One inorganic binder which has proved to be particularly advantageous is synthetic or natural anhydrite with a water-binder factor in the binder paste of about 0.38 to 0.75, preferably about 0.45 to 0.60.

The present process may be carried out as follows:

First of all the water-absorbing layer is laid. Prefabricated elements, such as porous bricks or blocks, may be used for this purpose. The porous absorption layer is preferably prepared in situ, for which purpose a foamed free-flowing mass is poured onto a substrate which subsequently hardens. There is no need to wait for the absorption layer to set completely, so that the free-flowing levelling mass may be poured on after only a few hours. A residual water content in the absorption layer actually improves adhesion between the absorption layer and the covering layer. The self-levelling mass forms a smooth, flat surface without any need for mechanical aids. The smooth, flat surface thus formed stiffens after about 15 to 40 minutes, depending upon the water uptake capacity of the absorption layer. This surface layer may be walked on after only about 24 hours.

The bending tension strength (as measured on strips cut out of the topping) generally amounts to between about 45 and 65 $kp/cm^2$. Values of up to about 85 $kp/cm^2$ can be reached.

It is of course also possible in accordance with the invention to produce prefabricated panels, for example in molds. The process may be carried out both continuously and in batches.

By virtue of the process according to the invention, it is readily possible to produce floor toppings of any size with a smooth, flat surface by the flow method without any need for mechanical surface treatment. There is no need for long hardening times. The floor topping shows high strength and does not have any cracks. Another advantage is the reduced unit weight of the topping as a whole. Outstanding insulation is obtained by using the effectively insulating porous absorption layer.

The process according to the invention is illustrated by the following Examples using anhydrite or anhydrite binder according to DIN 4208 and plaster of Paris according to DIN 1168.

EXAMPLE 1

The unfinished concrete floor of a room with a floor area of approximately 20 square meters is lined trough-fashion with 0.3 mm thick polyethylene film heat sealed along the seams. A foamed mass prepared by the following process is poured into the trough thus formed an aqueous solution of 0.2 part of a foaming wetting agent based on an alkyl sulfonate in 100 parts of water is beaten into a fine-pored foam in a vessel equipped with a "broom" stirrer. A mixture of 100 parts of anhydrite binder containing 1% of CaO and 50 parts of plaster of Paris is stirred into this aqueous foam. Immediately after this mixture has been stirred in, the foamed mass formed is poured into the prepared trough. The pouring height is visually adjusted to 25 mm. The dried foam has a unit weight of about 0.5 metric tons/$m^3$, i.e., t/$m^3$. After 24 hours, the layer of foam has hardened to such an extent that it can be walked on with care. A thinly liquid mass of anhydrite binder, containing approximately 1.1% of CaO and 1.0 of $K_2SO_4$ as activator, and water in a ratio by weight of 100 : 62 is then continuously prepared by stirring in a high speed mixer, and poured directly onto the layer of foam where it levels out evenly with a layer thickness of 30 mm. About 150 minutes after the mass has been introduced, its surface is optically dry, i.e., has been "sucked dry" by the absorption effect.

This load bearing layer can be walked on after another 24 hours and, after 28 days, has a bending tension strength of 54.3 kg/cm² (as measured on strips cut out of the topping) for a unit weight of 1.66 t/m³.

EXAMPLE 2

The unfinished concrete floor of a room with a floor area of 26 square meters is lined trough-fashion with 0.3 mm thick polyethylene film heat sealed along the seams. This area is then filled to a height of 25 mm with a foamed mass prepared by the following process: a dry mixture is prepared from 70 parts by weight of synthetic anhydrite containing 1% by weight of CaO, 30 parts by weight of plaster of Paris, 0.4 part by weight of aluminum nitrate and 0.03 part by weight of potassium permanganate. At the same time, a so-called foamer solution is prepared from 2.0 parts of 35% hydrogen peroxide, 0.15 part of an effectively foaming wetting agent and 3.0 parts of water. The dry mixture is suspended in a machine of the kind commonly used in the building industry for continuously mixing gypsum. The ratio of solids to water is adjusted to 1.0 : 0.65 The suspension is transferred from the machine to a delivery hose by means of a slush pump. The foamer solution is introduced into the suspension immediately after the slush pump by means of a metering pump. After having been delivered through the hose by a distance corresponding to a residence time of 20 seconds following the addition of the foamer solution, the foamed mass is cast into the prepared trough. The foamed mass actually reaches its final volume during casting, so that the required casting height can be visually adjusted. After 24 hours, the mass has hardened to such an extent that it can be walked on. The mass thus prepared has a unit weight of approximately 0.45 t/m³ on completion of drying.

24 Hours after the preparation of this foam layer, a thinly liquid mass of anhydrite binder, containing 1.1% of CaO and 1.0% of $K_2SO_4$ as activator, and water in a ratio by weight of 100 : 62 is continuously prepared by stirring in a high-speed mixer. This suspension is delivered into the room by means of a pump connected directly to the mixer, and is cast directly onto the foam layer in a thickness of 30 mm. This mass remains fluid for about 25 minutes and thus levels out spontaneously into a flat, smooth surface. About 2 hours after the mass has been introduced, its surface is optically dry, in other words it has been "sucked dry" by the absorption effect.

This surface can be walked on after 24 hours and, after 23 days, has a residual moisture content of 0.2% in the foam layer and of 0.3% in the load-bearing layer. At the same time, the layer of topping (load-bearing layer) is found by measurement to have a bending tension strength of 59.8 kp/cm² (as measured on strips cut out of the topping) for a unit weight of 1.73 t/m³.

EXAMPLE 3

As in Example 2, a watertight trough of polyethylene film is formed on an unfinished concrete floor with an area of 15 square meters. Thereafter, several batches of a mixture of 70 parts of anhydrite binder with a CaO-content of 1.2%, 30 parts of plaster of Paris, 0.3 part of potassium hydrogen phosphate, 1.5 parts of hydrogen peroxide (35%), 0.15 part of manganese dioxide and 46 parts of water, are prepared at the same time as one another, the components being mixed over a period of 10 minutes. The individual batches of the suspension are poured into the prepared trough immediately after one another with a pH of about 6.5. The casting height is set at 15 mm. The mass begins to expand after about 2 minutes, grows to a height of 35 mm after 12 minutes and begins to set at a constant volume after 16 minutes. The foam formed has fine uniform pores and, on completion of drying, has a density of 0.65 t/m³. After 24 hours, it has hardened to such an extent that it can be walked on. A levelling mass prepared in the same way and with the same composition as in Example 2 is then poured directly onto the layer of foam in a thickness of 35 mm. This mass remains fluid for about 20 minutes and levels out into a flat, smooth surface. About 2.5 hours after the mass has been introduced, its surface is optically dry, in other words it has been "sucked dry" by the absorption effect.

This surface layer can be walked on after 24 hours. After 28 days, the moisture content of the foam layer amounts to 0.3% while the surface layer has a moisture content of 0.4%. At the same time, the surface layer is found by measurement to have a bending tension strength of 52.8 kp/cm² (as measured on strips cut out of the topping) for a unit weight of 1.62 t/m³.

It will be appreciated that the instant specification and examples are set forth by way of illustration and not limitation, and that various modifications and changes may be made without departing from the spirit and scope of the present invention.

What is claimed is:

1. In the production of a floor topping by the flow method, comprising providing a water-absorbing layer on a floor to be topped, pouring a free-flowing mass comprising water and at least one of gypsum and anhydrite onto said water-absorbing layer whereby said mass forms a level floor topping, and allowing said mass to harden, the improvement which comprises emplying as said water-absorbing layer a strong porous open-cell foamed material.

2. A process as claimed in claim 1, wherein the strong porous open-cell material comprises at least one of anhydrite, gypsum, cement and lime.

3. A process as claimed in claim 1, wherein the water-absorbing layer is treated with a film-forming or water-repellent substance prior to contact with the free-flowing mass of binder and water.

4. A process as claimed in claim 1, wherein the water-absorbing layer is provided by casting on the floor a free-flowing foamed mass which hardens with the pore structure intact.

5. A process as claimed in claim 4, wherein the free-flowing foamed mass comprises an alkaline suspension of 100 parts by weight of gypsum, about 0.1 to 1 part of a water-soluble aluminum salt, about 0.5 to 5 parts of 35% $H_2O_2$ aqueous solution, and about 0.1 to 3 parts of a manganese compound, the ratio of solids to liquid in the suspension being about 1:0.4-1.

6. A floor topping produced according to claim 1.

7. A floor topping produced according to claim 6.

* * * * *